(12) United States Patent
Yang et al.

(10) Patent No.: US 7,366,612 B2
(45) Date of Patent: Apr. 29, 2008

(54) METHOD AND APPARATUS FOR COMPENSATING ATTITUDE OF INERTIAL NAVIGATION SYSTEM AND METHOD AND APPARATUS FOR CALCULATING POSITION OF INERTIAL NAVIGATION SYSTEM USING THE SAME

(75) Inventors: Jing Yang, Yongin-si (KR); Dong-yoon Kim, Seoul (KR); Won-chul Bang, Seongnam-si (KR); Wook Chang, Seoul (KR); Kyoung-ho Kang, Yongin-si (KR); Eun-seok Choi, Anyang-si (KR); Sung-jung Cho, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 764 days.

(21) Appl. No.: 10/935,303

(22) Filed: Sep. 8, 2004

(65) Prior Publication Data

US 2005/0065728 A1    Mar. 24, 2005

(30) Foreign Application Priority Data

Sep. 8, 2003    (KR)    ...................... 10-2003-0062779

(51) Int. Cl.
*G01C 21/00* (2006.01)
(52) U.S. Cl. ............................ 701/220; 701/3; 701/13; 701/66; 701/221; 340/945
(58) Field of Classification Search .................... 701/3, 701/4, 66, 13, 220, 221; 244/170; 340/945
See application file for complete search history.

(56) References Cited

U.S. PATENT DOCUMENTS 3,695,554 A * 10/1972 Phillips ....................... 244/170
6,820,025 B2 * 11/2004 Bachmann et al. ........... 702/94

* cited by examiner

*Primary Examiner*—Gertrude A. Jeanglaude
(74) *Attorney, Agent, or Firm*—Sughrue Mion, PLLC (57) ABSTRACT

Provided are a method and apparatus for compensating an attitude of an inertial navigation system and a method and apparatus for calculating a position of the inertial navigation system using the same. The method of compensating an attitude of the inertial navigation system includes sensing movement of the system and outputting information for stoppage time periods and a movement time period of the system; receiving angular velocity information of the system during every time period and calculating a first attitude of the system using the angular velocity information; receiving gravity direction information of the system during the stoppage time periods, calculating a second attitude of the system using the gravity direction information, and calculating an attitude error of the system during every time period using the first attitude and the second attitude; and compensating the attitude error for the first attitude.

25 Claims, 7 Drawing Sheets

(UNITS: m)

| CHARACTER | PRIOR ART | PRESENT INVENTION | CHARACTER | PRIOR ART | PRESENT INVENTION | CHARACTER | PRIOR ART | PRESENT INVENTION |
|---|---|---|---|---|---|---|---|---|
| 0 | 0.0104 | 0.0097 | c | 0.0091 | 0.0071 | o | 0.0085 | 0.095 |
| 1 | 0.0037 | 0.0039 | d | 0.0117 | 0.0138 | p | 0.0533 | 0.0078 |
| 2 | 0.0061 | 0.0052 | e | 0.0217 | 0.0121 | q | 0.0769 | 0.0190 |
| 3 | 0.0236 | 0.0257 | f | 0.0064 | 0.0058 | r | 0.0073 | 0.0074 |
| 4 | 0.0094 | 0.0052 | g | 0.0233 | 0.0259 | s | 0.0129 | 0.0121 |
| 5 | 0.0933 | 0.0162 | h | 0.0113 | 0.0102 | t | 0.0023 | 0.0015 |
| 6 | 0.0027 | 0.0031 | i | 0.0136 | 0.0131 | u | 0.0108 | 0.0115 |
| 7 | 0.0056 | 0.0071 | j | 0.0062 | 0.0049 | v | 0.0116 | 0.0080 |
| 8 | 0.0568 | 0.0495 | k | 0.0088 | 0.0076 | w | 0.005 | 0.0030 |
| 9 | 0.0613 | 0.0212 | l | 0.0143 | 0.0182 | x | 0.0136 | 0.0126 |
| a | 0.0197 | 0.0218 | m | 0.0202 | 0.0160 | y | 0.0477 | 0.0039 |
| b | 0.0042 | 0.0040 | n | 0.0064 | 0.0064 | z | 0.004 | 0.0095 |
| | | | | | | MAXIMUM | 0.0933 | 0.0495 |
| | | | | | | MINIMUM | 0.0023 | 0.0015 |
| | | | | | | AVERAGE | 0.0195 | 0.0116 |

METHOD AND APPARATUS FOR COMPENSATING ATTITUDE OF INERTIAL NAVIGATION SYSTEM AND METHOD AND APPARATUS FOR CALCULATING POSITION OF INERTIAL NAVIGATION SYSTEM USING THE SAME

This application claims the priority of Korean Patent Application No. 2003-62779, filed on Sep. 8, 2003, in the Korean Intellectual Property Office, the disclosure of which is incorporated herein in its entirety by reference.

BACKGROUND OF THE INVENTION

1. Field of the Invention

The present invention relates to a method and apparatus for compensating an attitude of an inertial navigation system and a method and apparatus for calculating a position of the inertial navigation system using the same.

2. Description of the Related Art

In order to measure a position and an attitude of an object that moves in a three dimensional space using an inertial sensor, an inertial measurement unit comprising a triaxial acceleration sensor and a triaxial angular velocity sensor should be used. The attitude of the inertial navigation system can be obtained by solving a differential equation for the angular velocity measured by a gyroscope used as the triaxial angular velocity sensor. The position of the inertial navigation system can be obtained by removing a gravity component according to the attitude of the inertial navigation system and from the acceleration measured by an acceleration sensor and by a double integral of the acceleration from which the gravity component is removed. In this case, due to the gyroscope's drift and other noise, the attitude error of the inertial navigation system increases over time for the angular velocity error, and the error of the acceleration from which the gravity component is removed also increases over time for the angular velocity error. Thus, the position error of the inertial navigation system increases over a square of time for the acceleration error, and the attitude error of the inertial navigation system increases over a cube of time for the angular velocity error. Due to an error that rapidly increases in time, it is very difficult to calculate the position of the inertial navigation system using an inertial sensor for a long period of time. Thus, it is required to compensate the attitude of a moving object calculated from acceleration and angular velocity measured by inertial sensors and to calculate the position of the object.

SUMMARY OF THE INVENTION

The present invention provides a method and apparatus for compensating an attitude of an inertial navigation system and a method and apparatus for calculating a position of the inertial navigation system using the same, in which acceleration and angular velocity measured by an inertial measurement unit are compensated and the position of the inertial navigation system is determined using the compensated values.

According to a first exemplary embodiment of the present invention, there is provided a method of compensating an attitude of an inertial navigation system. The method comprises sensing movement of the system and outputting information for both stoppage time periods and a movement time period of the system; receiving angular velocity information of the system during every time period and calculating a first attitude of the system using the angular velocity information; receiving gravity direction information of the system during the stoppage time periods, calculating a second attitude of the system using the gravity direction information, and calculating an attitude error of the system during every time period using the first attitude and the second attitude; and compensating the attitude error for the first attitude.

According to a second exemplary embodiment of the present invention, there is provided an apparatus that compensates an attitude of an inertial navigation system. The apparatus comprises a movement sensor, which senses movement of the system and outputs information for stoppage time periods and a movement time period of the system; an attitude calculating unit, which receives angular velocity information of the system during every time period and calculates a first attitude of the system using the angular velocity information; an attitude error calculating unit, which receives gravity direction information of the system during the stoppage time periods, calculates a second attitude of the system from the gravity direction information, and calculates an attitude error of the system for each time period using the first attitude and the second attitude; and an attitude compensating unit, which compensates and outputting the attitude error for the first attitude.

According to a third exemplary embodiment of the present invention, there is provided a method of calculating a position of an inertial navigation system. The method comprises sensing movement of the system and outputting information for stoppage time periods and a movement time period of the system; receiving angular velocity information of the system, calculating an attitude of the system using the angular velocity information, receiving acceleration information of the system, and compensating the attitude of the system using the acceleration information; transforming the acceleration information into acceleration information in a space including the system using the compensated attitude; and calculating a position of the system in the space using the transformed acceleration information.

According to a fourth exemplary embodiment of the present invention, there is provided an apparatus that calculates a position of an inertial navigation system, the apparatus comprising a movement sensor sensing movement of the system and outputs information for stoppage time periods and a movement time period of the system; an attitude compensating unit receiving angular velocity information of the system, calculating an attitude of the system using the angular velocity information, receiving acceleration information of the system, and compensating the attitude of the system using the acceleration information; an acceleration transforming unit transforming the acceleration information into acceleration information in a space including the system using the compensated attitude; and a position calculating unit calculating a position of the system in the space using the transformed acceleration information.

BRIEF DESCRIPTION OF THE DRAWINGS

The above aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
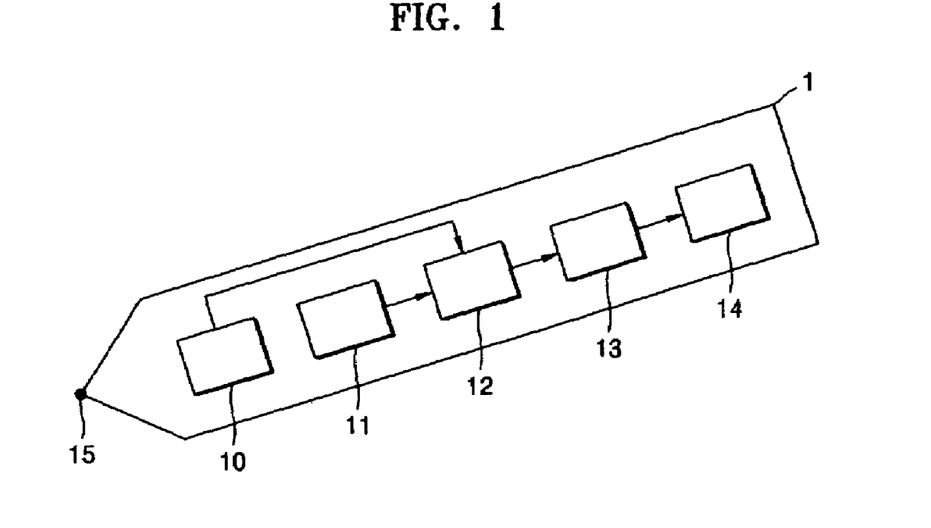
FIG. 1 is a block diagram of a pen-shaped 3D input device using an inertial navigation system.

FIG. 1 is a block diagram of a pen-shaped 3D input device using an inertial navigation system. The 3D input device (pen) 1 shown in FIG. 1 comprises a gravity direction sensor 10, an angular velocity sensor 11, a circuit unit 12, a processor 13, and a wireless communication unit 14. The gravity direction sensor 10 may be a tilt sensor which senses a direction of gravity of the pen 1 and outputs gravity direction information indicating a tilting angle with respect to a triaxial direction. The gravity direction sensor 10 may also be an acceleration sensor. Although the gravity direction sensor 10 will be limited to the acceleration sensor, hereinafter, the gravity direction sensor 10 means basically a device which outputs the gravity direction information.

The acceleration sensor 10 senses and outputs triaxial acceleration of movement of the pen 1, and the angular velocity sensor 11 senses and outputs triaxial angular velocity of the pen 1.

The circuit unit 12 converts the output acceleration and angular velocity into a digital value. The processor 13 calculates a position of the pen 1 in a navigation frame, in which any one point in a space in which the pen 1 exists is considered as an origin. This position is calculated from the acceleration and angular velocity obtained from a body frame, in which any one point of the pen 1, for example a tip 15, is considered as an origin. The processor 13 compensates the measured attitude of the pen 1 by compensating for an error that occurs unavoidably in the angular velocity sensor 11 and calculates a more accurate position of the pen 1 in the navigation frame by compensating the measured acceleration of the pen 1 using the compensated attitude of the pen 1. The wireless communication unit 14 communicates information on a basis of the position of the pen 1, as calculated by the processor 13, to an external device such as a computer, a digital TV or a PDA in a predetermined wireless communication manner.

Figure 2:
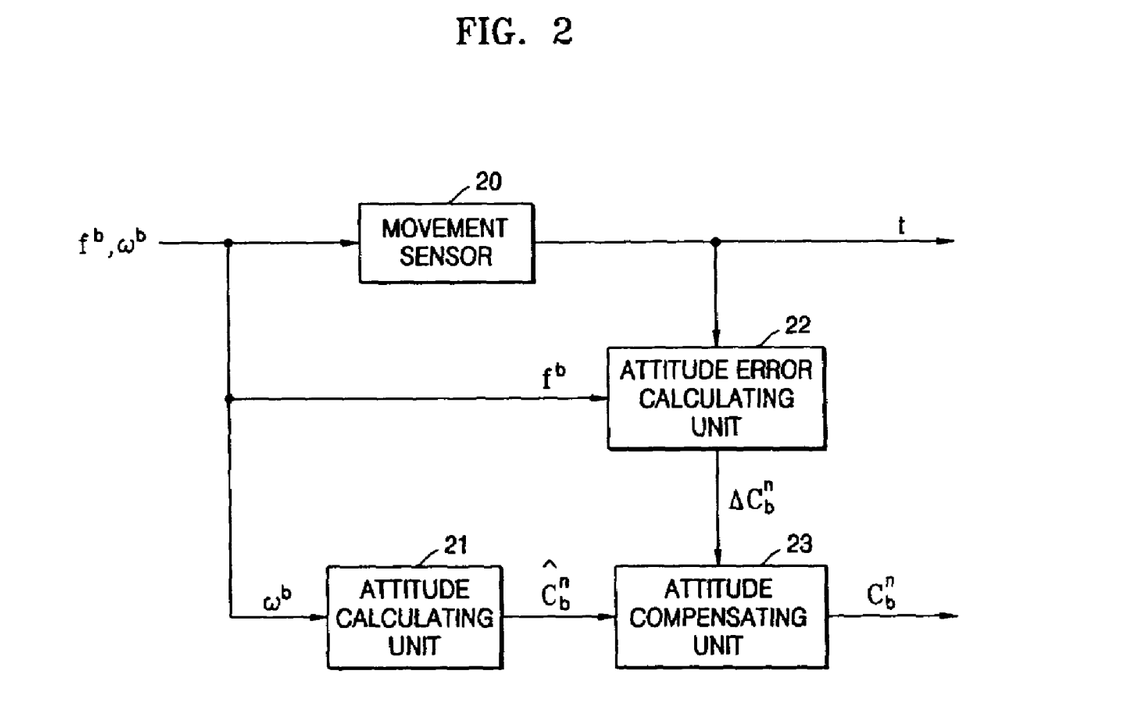
FIG. 2 is a block diagram of an apparatus that compensates the attitude of an inertial navigation system according to an embodiment of the present invention.

FIG. 2 is a block diagram of an apparatus that compensates the attitude of an inertial navigation system according to an embodiment of the present invention. The apparatus compensates the attitude of the pen 1 and may correspond to the processor 13. The apparatus comprises a movement sensor 20, an attitude calculating unit 21, an attitude error calculating unit 22, and an attitude compensating unit 23.

The movement sensor 20 determines whether the pen 1 is moving during a stroke of the pen 1 to detect a stoppage or movement time period. The movement of the pen 1 may be determined using a unit that discriminates the movement of the pen 1 from the stoppage of the pen 1. Otherwise, the movement of the pen 1 can be determined using acceleration information $f^b$ or angular velocity information $\omega^b$ input from the acceleration sensor 10 or the angular velocity sensor 11. Determining the movement of the pen 1 from $f^b$ or $\omega^b$ can be performed by obtaining a standard deviation of $f^b$ or $\omega^b$, and when the obtained standard deviation is less than or equal to a predetermined threshold value, it can be determined that the pen 1 is stopped temporarily. Here, superscript b is a measured value in the body frame.

The attitude calculating unit 21 calculates parameters, for example Euler angles, that is, a roll angle $\phi_{ins}$, a pitch angle $\theta_{ins}$, and a yaw angle $\psi_{ins}$ indicating the attitude of the pen 1 in the navigation frame. The calculation is performed using a well-known theory of an inertial navigation system (INS) from the angular velocity information $\omega^b$. The attitude calculating unit 21 then calculates an attitude matrix $\hat{C}_b^n$ indicating the attitude of the pen 1 in the navigation frame relative to the body frame.

The attitude error calculating unit 22 calculates an attitude error matrix $\Delta C_b^n$ using the acceleration information $f^b$ and calculates a movement time detected by the movement sensor 20. This will now be described in detail.

The acceleration of the pen 1 measured by the acceleration sensor 10 is assumed to be much smaller than gravitational acceleration of the pen 1. In order to remove the effect of gravity on acceleration, therefore, the attitude of the pen 1 should be precisely measured. Due to drift of the angular velocity sensor 11 and other noise, the attitude error increases over time. Considering a period of the stoppage time of the pen 1, the acceleration sensor 10 senses only a gravity component. However, acceleration measurement values on each axis vary according to the attitude of the pen 1. Only the roll angle $\phi_{acc}$ and the pitch angle $\theta_{acc}$ among the Euler angles are used to specify the attitude of the pen 1 obtained from the acceleration measurement values. The roll angle and the pitch angle obtained from the acceleration measurement values are given by Equation 1.

$$\phi_{acc} = \tan^{-1}\left(\frac{-f_y^b}{-f_z^b}\right)$$

$$\theta_{acc} = \sin^{-1}\left(\frac{f_x^b}{g}\right) = \tan^{-1}\left(\frac{f_x^b}{\sqrt{(f_z^b)^2 + (f_z^b)^2}}\right)$$

$$\phi_{acc} = \tan^{-1}\left(\frac{-f_y^b}{-f_z^b}\right) \quad (1)$$

$$\theta_{acc} = \sin^{-1}\left(\frac{f_x^b}{g}\right) = \tan^{-1}\left(\frac{f_x^b}{\sqrt{(f_z^b)^2 + (f_z^b)^2}}\right)$$

where, g is gravitational acceleration, and $f_x^b, f_y^b, f_z^b$ are triaxial gravity direction information. Also, superscript b is a measured value in the body frame.

When a gravity direction sensor is adopted, said $\phi_{acc}$ and $\theta_{acc}$ may also be obtained from a gravity direction tilt using Equation 1.

The Euler angles indicating the attitude of the pen 1 may also be obtained using INS theory. In other words, the Euler angles may also be obtained by integrating angular velocity sensed by the angular velocity sensor 11. Thus, when an error is included in the sensed angular velocity, an error is also incurred in the attitude of the pen 1. In particular, due to drift of the angular velocity sensor 11, an attitude error is accumulated over time. However, if the attitude of the pen 1 is obtained from the acceleration information using Equation 1, the attitude error does not increase according to time but depends on only noise incurred in the acceleration measurement by the acceleration sensor 10. Therefore, the attitude of the pen 1 obtained from the acceleration information may be used as a reference attitude when the pen 1 stops.

However, the yaw angle $\psi$ cannot be obtained from the acceleration measurement, but an initial yaw angle is not an important factor for measuring the attitude of the pen 1. In general, the yaw angle is set to 0° when a stroke of the pen 1 starts.

Since the drift of the angular velocity sensor 11 is a main factor of error in angular velocity measurement, and an angle indicating the attitude of the pen 1 is obtained by integration of the angular velocity, the attitude error may be expressed as a linear function of time during handwriting. The attitude error that occurs during a stroke of the pen 1 can be estimated by an attitude calculated from the acceleration information measured during a period between the start and end of the stroke.

In order to compensate for the attitude error, a handwriting period is divided into three time periods, that is, a pause start time period of $0 \leq t \leq t_1$, a handwriting time period of $t_1 \leq t \leq t_2$, and a pause end time period of $t_2 \leq t \leq t_{end}$. When the attitude of the pen 1 obtained from the INS theory during a period of $0 \leq t \leq t_{end}$ is indicated by $\phi_{ins}(t)$, $\theta_{ins}(t)$, $\psi_{ins}(t)$, the attitude of the pen 1 may be indicated by $\phi_{acc}(t)$, $\theta_{acc}(t)$, $0 \leq t \leq t_1$, $t_2 \leq t \leq t_{end}$. Since different reference information is obtained in the three time periods, different methods are used when the attitude error is estimated. As an example of one such method, a compensation principle for the roll angle, will now be described.

Assuming that during the time period of $0 \leq t \leq t_1$, an error due to initial misalignment at t=0 does not occur, then a roll angle error increases linearly over time and can be modeled as:

$$\Delta\phi(t) = k_1 t, \quad k_1 = \frac{\phi_{ins}(t_1) - \phi_{acc}(t_1)}{t_1} \quad (2)$$

Since there is no reference attitude when $t_1 < t < t_2$, a reference attitude during other time period is used only to estimate the attitude error. When an attitude error model satisfies a linear function according to time, the attitude error can be modeled as.

$$\Delta\phi(t) = k_2 t + b \quad (3)$$
$$k_2 = \frac{[\phi_{ins}(t_2) - \phi_{acc}(t_2)] - [\phi_{ins}(t_1) - \phi_{acc}(t_1)]}{t_2 - t_1},$$
$$b = \frac{[\phi_{ins}(t_1) - \phi_{acc}(t_1)]t_2 - [\phi_{ins}(t_2) - \phi_{acc}(t_2)]t_1}{t_2 - t_1}$$

During $t_2 \leq t \leq t_{end}$, the trajectory of the pen 1 uses position information of the time period of $t_1 < t < t_2$. Thus, if the attitude error during $t_2 \leq t \leq t_{end}$ is constant, the roll angle error still increases according to time, and the model given by Equation 3 can be used. A pitch angle error can also be modeled as the roll angle error is modeled.

If the attitude error is estimated according to the above-described linear modeling, the attitude error matrix $\Delta C_b^n$ is obtained from the estimated attitude error.

The attitude compensating unit 23 outputs the attitude matrix $C_b^n$ for which the error $\Delta C_b^n$ is compensated for $\hat{C}_b^n$ output from the attitude calculating unit 21.

Figure 3A:
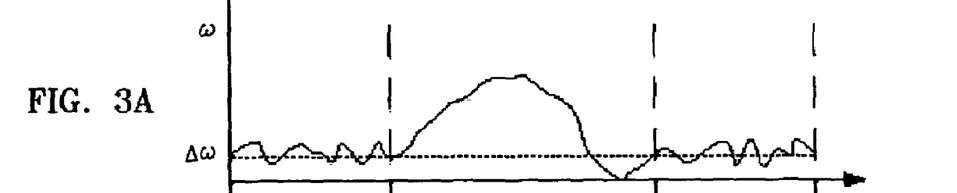
FIGS. 3A through 3E illustrate a process of compensating for the attitude of the inertial navigation system obtained from angular velocity information.
Figure 3B:
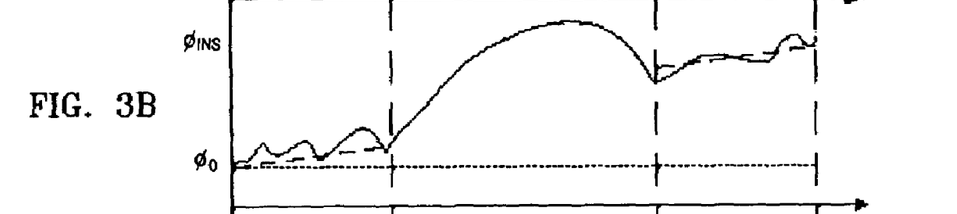
Figure 3C:
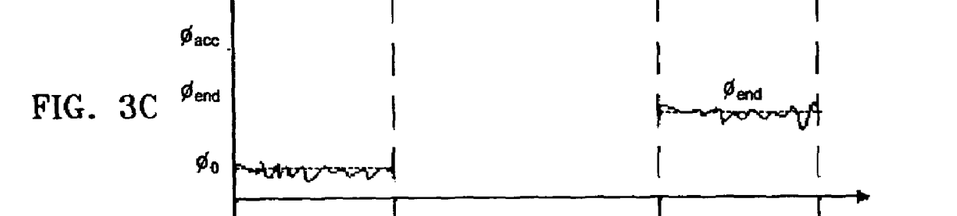

A method of compensating for the attitude of the pen 1 will now be described with reference to FIGS. 3 and 4 in case of the roll angle. FIGS. 3A through 3E illustrate a process of compensating for a roll angle obtained from angular velocity information, and FIG. 4 is a flowchart illustrating the method of FIG. 3.

The angular velocity sensor 11 senses and outputs angular velocity information $\omega$ (step 40). Referring to FIG. 3A, the magnitude of the output angular velocity is large during the time period of the stroke of the pen 1, and during the pause time periods, the output angular velocity has drift $\Delta\omega$ that does not become 0 due to noise inherited in a sensor itself.

The angular velocity information is integrated considering an initial angle $\phi_0$ according to the INS theory so that $\phi_{ins}(t)$ is obtained (step 41). The obtained $\phi_{ins}(t)$ is as shown in FIG. 3B. In addition, an operation of Equation 1 is performed on the acceleration information $f^b$ to obtain $\phi_{acc}(t)$ (step 42). The obtained $\phi_{ins}(t)$ is shown as an initial angle $\phi_0$ and an angle value $\phi_{end}$, as shown in FIG. 3C.

Figure 3D:
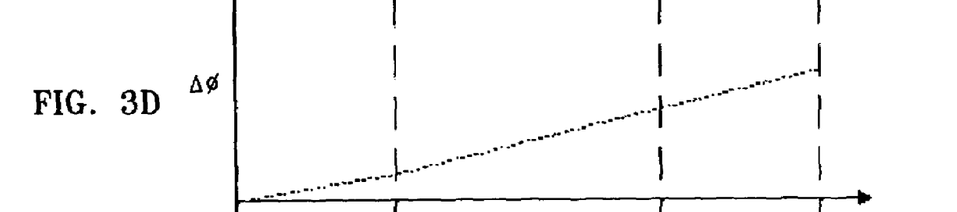
Figure 4:
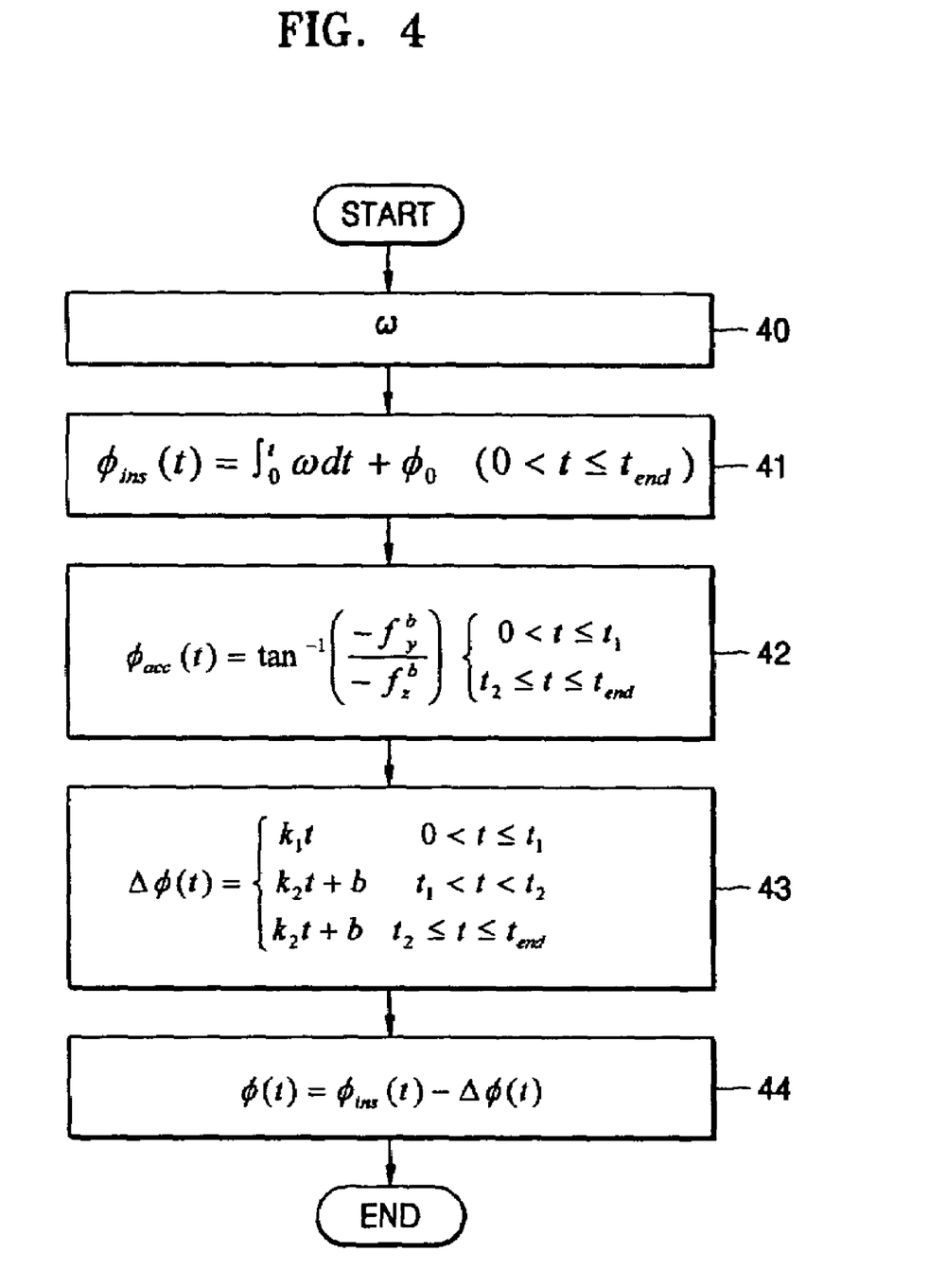
FIG. 4 is a flowchart illustrating the method of compensating the attitude of the inertial navigation system.

The roll angle error $\Delta\phi(t)$ is linearly approximated using $\phi_{ins}(t)$ and $\phi_{acc}(t)$ in Equations 2 and 3, as shown in FIG. 3D (step 43). Compensating for the roll angle is given by (step 44)

$$\phi(t) = \phi_{ins}(t) - \Delta\phi(t) \quad (4)$$

Figure 3E:
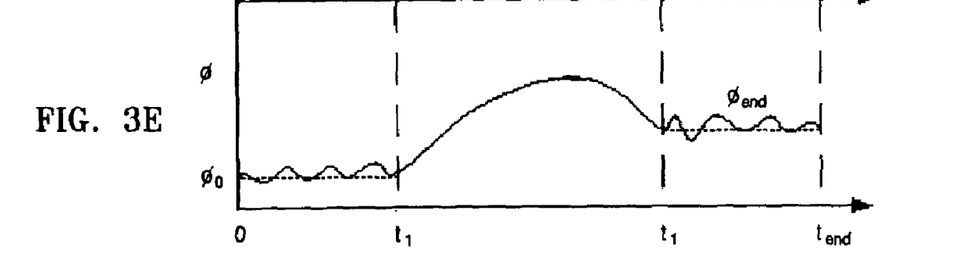

The finally-compensated roll angle does not increase over time before the start of the stroke of the pen 1 or after the end of the stroke of the pen 1 and is stable, as shown in FIG. 3E.

Figure 5:
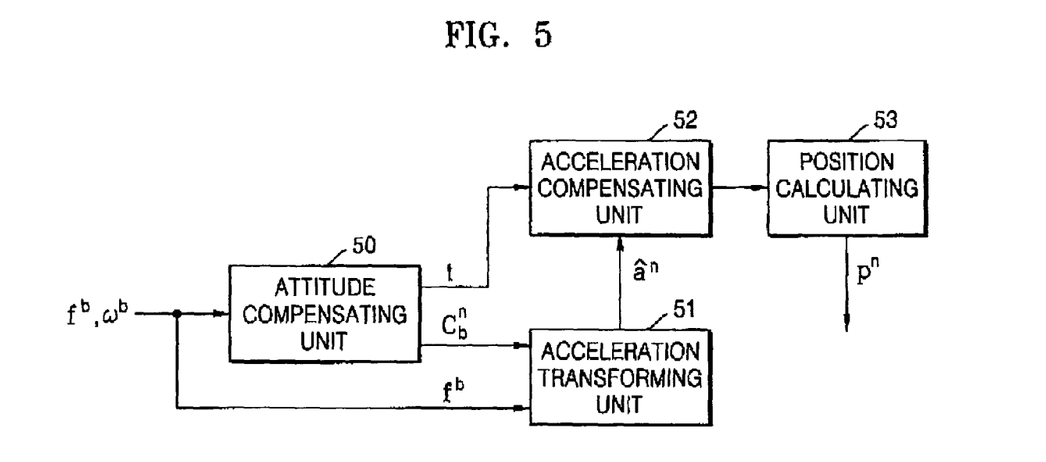
FIG. 5 is a block diagram of an apparatus that calculates the position of an inertial navigation system using the apparatus that compensates the attitude of the inertial navigation system according to an embodiment of the present invention.

FIG. 5 is a block diagram of an apparatus that calculates the position of an inertial navigation system using the apparatus that compensates the attitude of the inertial navigation system according to an embodiment of the present invention.

The apparatus that calculates the position of the inertial navigation system comprises an attitude compensating unit 50, an acceleration transforming unit 51, an acceleration compensating unit 52, and a position calculating unit 53. The acceleration compensating unit 52 may be optional.

The attitude compensating unit 50 has a structure as shown in FIG. 2. In this case, acceleration information and angular velocity information are input into the attitude compensating unit 50. The attitude compensating unit 50 outputs a movement time t of the pen 1 and a compensated attitude matrix $C_b^n$. The acceleration transforming unit 51 outputs acceleration â in the navigation frame given by Equation 5 using $C_b^n$ and acceleration information $f^b$ output from the acceleration sensor 10.

$$\hat{a}^n(t) = C_b^n a^b(t) \quad (5)$$

The acceleration compensating unit 52 compensates for $\hat{a}^n$ using the movement time t, output from the attitude compensating unit 50. Here, the acceleration compensating unit 52 may be optional. In other words, the position calculating unit 53 may perform a double integral of the acceleration in the navigation frame, which is output from the acceleration transforming unit 51, without compensation and calculates the position of the pen 1 in the navigation frame.

In case of using the acceleration compensating unit 52, a process of compensating for the acceleration will now be described.

An error $\Delta a^n(t)$ of the acceleration $a^n(t)$ is generated basically by the acceleration sensor 10 and the angular velocity sensor 11 and is given by.

$$\Delta a^n(t) = f[\Delta C_b^n, C_b^n, \delta f^b, f^b(t), t] \quad (6)$$
$$= [I - C_p^n(t)]C_b^p(t)f^b(t) + C_b^n(t)\delta f^b(t)$$

where, $\delta f^b(t)$ is an acceleration error in the body frame generated by an acceleration error and an attitude error, and $\Delta C_b^n$ is an attitude error matrix obtained from an attitude angle error $\Delta \phi$, $\Delta \theta$, $\Delta \psi$ and an angle error $\Delta \phi_0$, $\Delta \theta_0$, $\Delta \psi_0$ due to initial misalignment.

The acceleration information measured in the body frame is transformed into a value in the navigation frame. The first term of the second row of Equation 6 represents acceleration deviated from a true value using the attitude matrix $C_b^n$ calculated in the body frame.

For a rough estimation value, a horizontal acceleration error that is incurred due to an angular error caused by gravity can be represented by 1 g×sin ($\Delta \theta$), and this value is added to an acceleration vector in the navigation frame. For example, if acceleration accuracy is maintained in an acceleration sensor having an accuracy of 0.1 mg unit during handwriting, the accuracy of the pitch angle and the roll angle would be maintained at 0.0057°. Even at this accuracy, a position error after 5 minutes is about 1.225 cm.

The second term of Equation 6 shows that $\delta f^b(t)$ depends on $C_b^n(t)$ and has an effect on $a^n(t)$. The second term of Equation 6 is given by a complex nonlinear function of time. If there is no variation in an attitude, a constant acceleration error in the body frame is linked to a constant acceleration error in the navigation frame. However, in practice, an attitude during handwriting continuously varies according to time. Even though the acceleration error is constant, an effect on $\Delta a^n(t)$ varies according to the complex nonlinear function of time. Simultaneously, a variable attitude error increases the complexity of a nonlinear relationship.

Figure 6A:
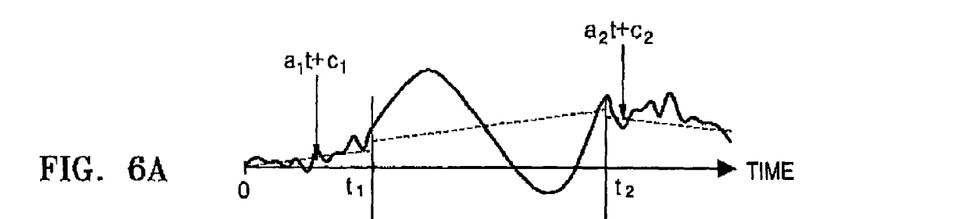
FIGS. 6A through 6C illustrate a process of linearizing acceleration.
Figure 6B:
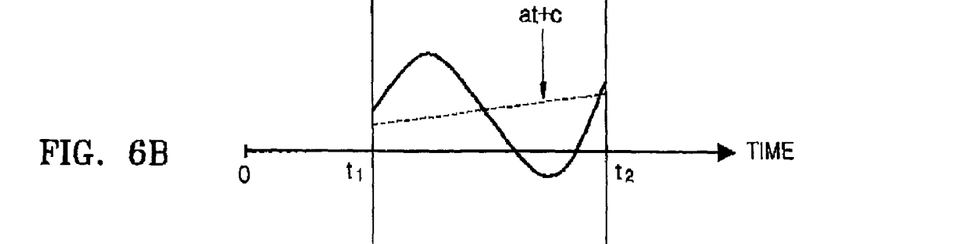
Figure 6C:
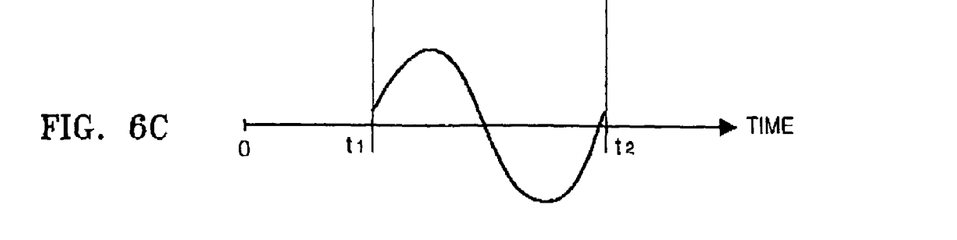

In the present invention, nonlinear acceleration is linearized, as shown in FIG. 6. This will now be described in detail.

A linear regression method is applied to acceleration values recorded over a time period $0 < t < t_1$ before the pen 1 moves in order to obtain a line $a_1 t + c_1$ to which the measured acceleration values are linearly approximated, as shown in FIG. 6A. Simultaneously, the linear regression method is used in acceleration values recorded when $t > t_2$ in which the pen 1 is stopped in order to obtain a line $a_2 t + c_2$ to which the measured acceleration values are linearly approximated, as shown in FIG. 6A.

Intuitively, it is possible to know that the linear velocity of the pen 1 during the pause time periods $0 < t < t_1$ and $t > t_2$ of the pen 1 is substantially 0. Thus, the acceleration during the pause time periods is also 0. Thus, as shown in FIG. 6B, acceleration in each pause time period is set to 0, and subsequently, linear components become errors. This is also referred to as zero velocity compensation.

An acceleration error at+c during a movement time period $t_1 < t < t_2$ is approximated using the approximated acceleration errors $a_1 t + c_1$ and $a_2 t + c_2$ in each pause time period. A gradient a of the approximated acceleration error during the movement time period is determined by Equation 7, and then, an intercept c is determined.

$$a = \frac{(a_2 t_2 + c_2) - (a_1 t_1 + c_1)}{t_2 - t_1} \quad (7)$$

The gradient a of the acceleration errors may be alternatively determined by Equation 8 using the gradients of the approximated acceleration errors in each pause time period.

$$a = \frac{(a_1 + a_2)}{2} \quad (8)$$

As shown in Equation 8, the fact that the gradient of the acceleration error in the movement time period can be obtained by averaging the gradients of the acceleration error during each pause time period is based on the intuition that the acceleration error measured by the pen 1 vary continuously.

The intercept c can be obtained by Equation 9 under a condition that integration of actual acceleration, which is measured and compensated for, from $t_1$ to $t_2$ should be 0, since the velocity of the pen 1 at times $t_1$ and $t_2$ is 0.

$$\int_{t_1}^{t_2} \hat{A} dt = \int_{t_1}^{t_2} \{A - (at+c)\} dt = 0 \quad (9)$$

Here, $\hat{A}$ is the compensated acceleration, and A is the measured acceleration.

Solving Equation 9 for c gives.

$$c = \frac{\int_{t_1}^{t_2} (A - at) dt}{t_2 - t_1} \quad (10)$$

The acceleration error at+c in the movement time period $t_1 < t < t_2$ obtained by Equations 7 or 8 and 10 is shown in FIG. 6B with a zero velocity compensated acceleration curve.

When $t_1 < t < t_2$, the acceleration error at+c is subtracted from the measured acceleration, and a compensated acceleration A" in the navigation frame is given.

$$A'' = A - (at+c) \quad (11)$$

FIG. 6C shows acceleration in which zero velocity compensation is performed and the acceleration error in the movement time period is compensated for.

If acceleration compensation is performed by the acceleration compensating unit 52 using the above-described procedure, the position calculating unit 53 performs a double integral on the acceleration and calculates the position of the pen 1 in the navigation frame.

Alternatively, an acceleration error value satisfying the condition that the velocity at times when the pen 1 starts to move and stops is 0 is obtained to compensate for the acceleration, under an assumption that an acceleration error is constant. The calculated acceleration error value is subtracted from the measured acceleration, and a double integral is performed on the acceleration with respect to time, thereby obtaining the position of the pen 1.

Figure 7:
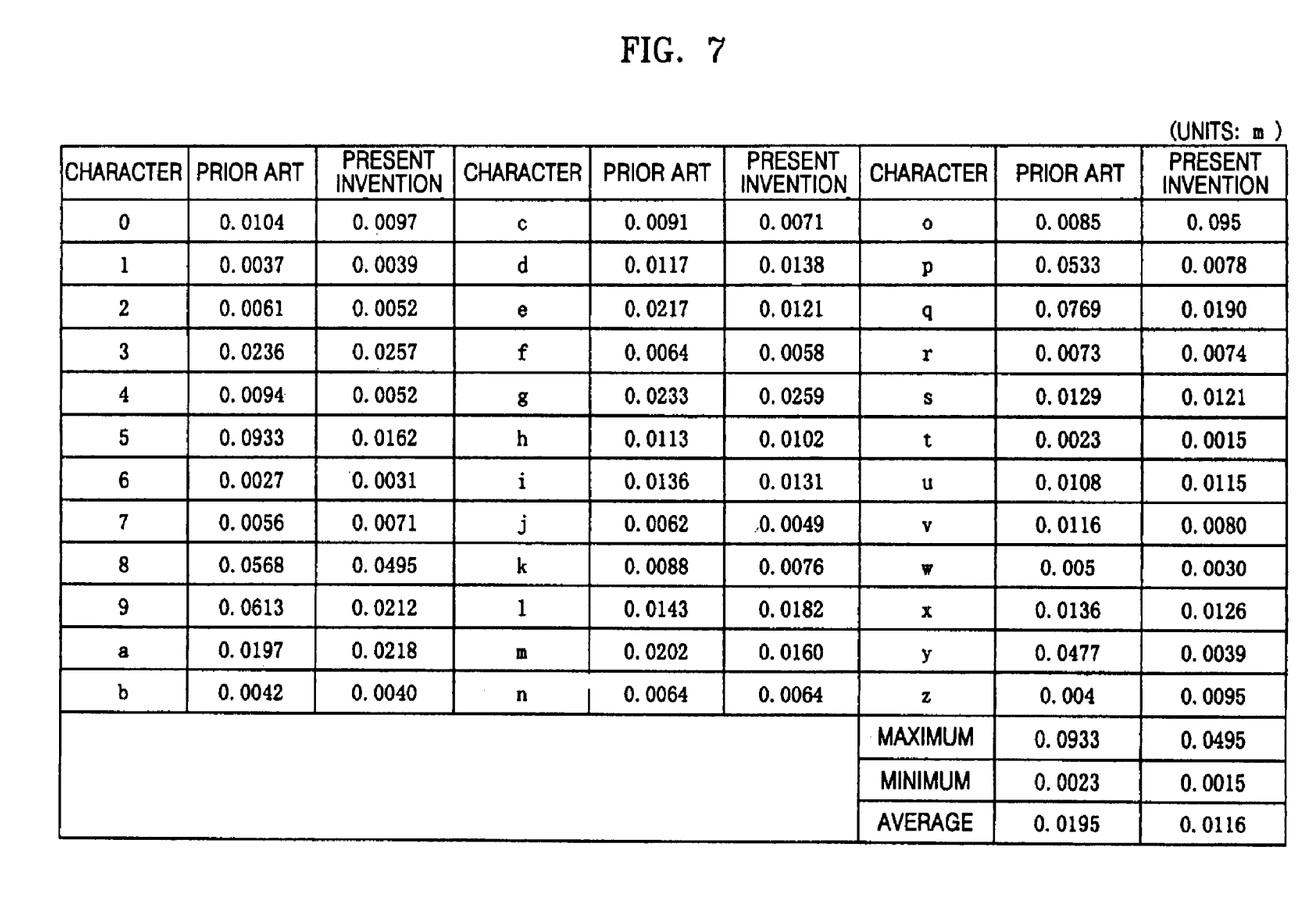
FIG. 7 is a table showing errors of trajectories of characters in a prior art in which compensation is not performed and errors of trajectories of the same characters according to the present invention in which compensation is performed.

FIG. 7 is a table showing errors of trajectories by pen strokes for some characters in the prior art in which compensation is not performed and errors of trajectories of the same characters according to the present invention in which compensation is performed. Trajectories recorded in a Wacom Intous tablet are used as reference trajectories. It shows positional errors between reference trajectories and corresponding INS pen trajectories reproduced by a prior art method and the method according to an embodiment of the present invention, respectively. A positional error can be given as follows.

$$J_{method} = \sqrt{\frac{1}{N}\sum_{k=1}^{N}(P_n^{tablet}(kT) - P_n^{method}(kT))^2} \quad (12)$$

Here, N is the number of samples for a given character, T is a sampling interval, $P_n^{tablet}$ is reference position information obtained from the tablet, and $P_n^{method}$ is position information calculated by the prior art or the present invention. In other words, the positioned error is a distance between the reference position information and the position information by the prior art or the present invention for a given character. Referring to FIG. 7, the positioned errors according to the present invention are smaller than the ones by the prior art for a maximum, a minimum, and an average distance for the given character. As such, the reproduction performance of the trajectory according to the present invention is higher than the one by the prior art. In particular, the averaged positional error is improved from 0.0195 m to 0.016 m.

Figure 8A:
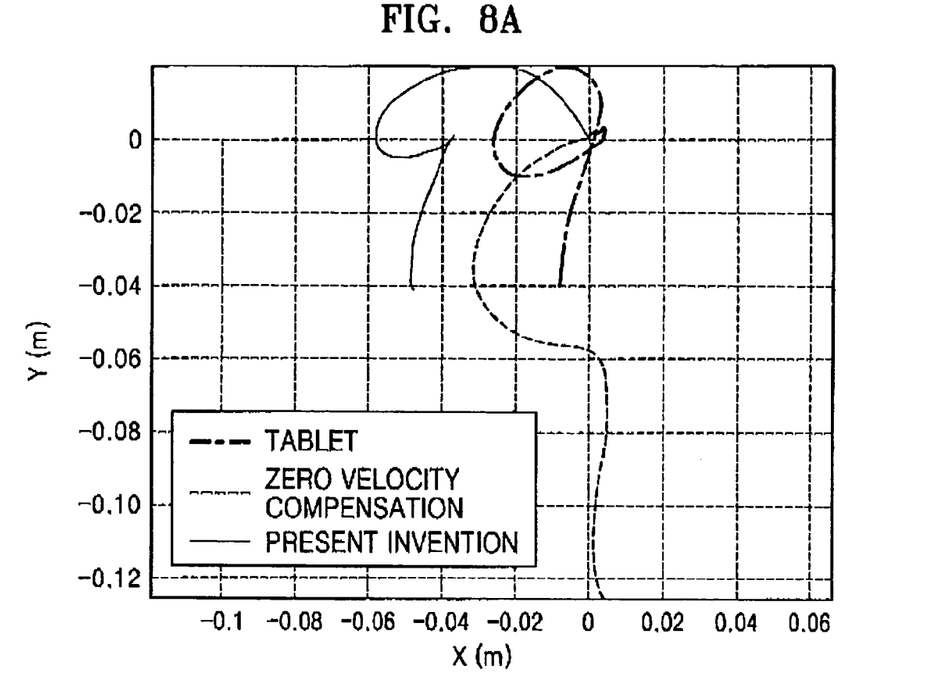
FIGS. 8A through 8C show trajectory tracing results in a prior art in which only zero velocity compensation is performed as acceleration compensation and according to the present invention in which both acceleration and angular velocity compensation are performed when tablets are used as reference trajectories.
Figure 8B:
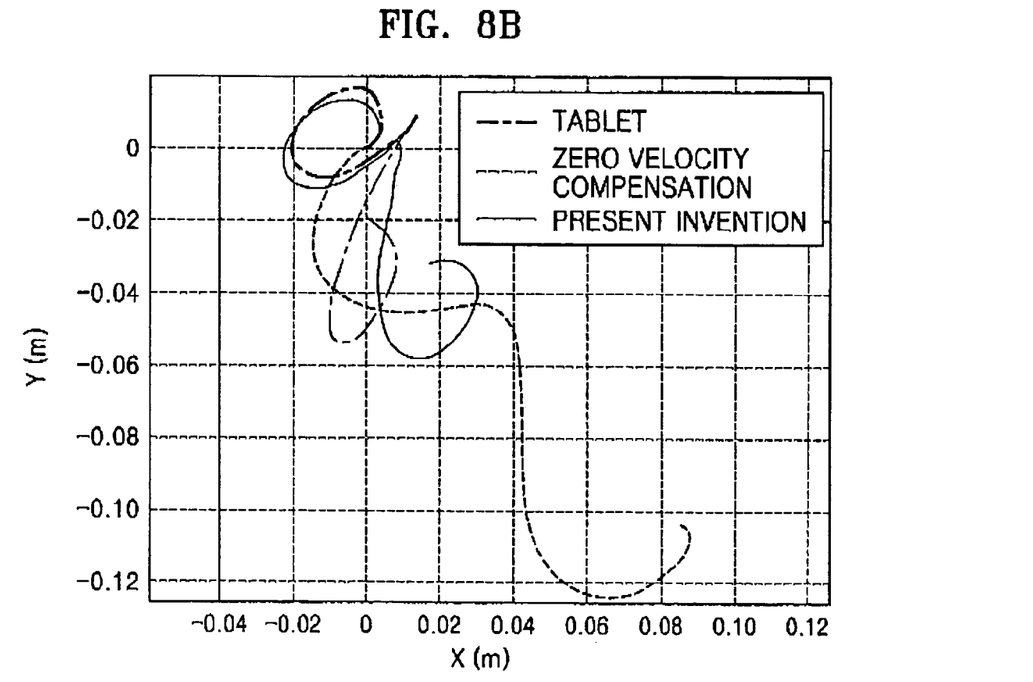
Figure 8C:
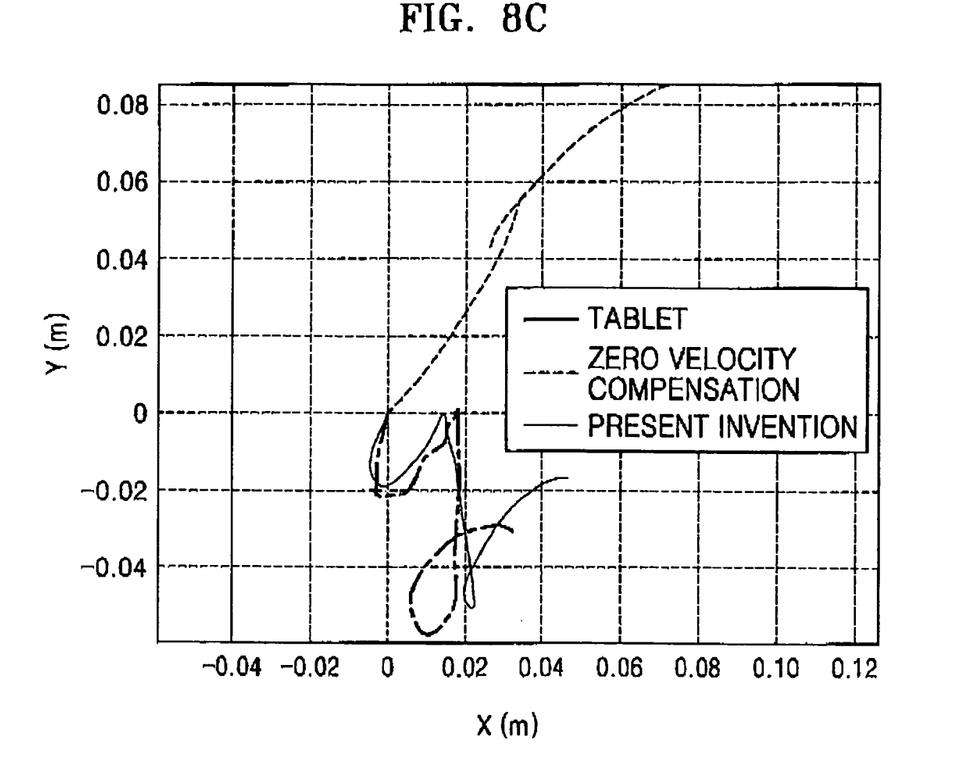

FIGS. 8A through 8C show trajectory tracing results in prior art in which only zero velocity compensation is performed and according to the present invention in which both acceleration and angular velocity compensation are performed when tablets are used as reference trajectories. The results show "9", "q", and "y" trajectories, respectively. As shown in FIGS. 8A through 8C, compensation results according to the present invention follow the reference trajectory more accurately.

As described above, according to the present invention, not only acceleration compensation but also angular velocity compensation is considered when following the trajectory of an INS such that a more accurate trajectory can be traced. In addition, during acceleration compensation or angular velocity compensation, a complex nonlinear function is approximated to a linear function and compensated, such that simpler calculations are performed.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A method of compensating an attitude of an inertial navigation system, comprising:
   sensing movement of the system and outputting information for both stoppage time periods and a movement time period of the system;
   receiving angular velocity information of the system during every time period and calculating a first attitude of the system using the angular velocity information;
   receiving gravity direction information of the system during the stoppage time periods, calculating a second attitude of the system using the gravity direction information, and calculating an attitude error of the system during every time period using the first attitude and the second attitude; and
   compensating the attitude error for the first attitude.

2. The method of claim 1, wherein the stoppage time periods include a first stoppage time period before the system begins movement and a second stoppage time period after movement of the system stops.

3. The method of claim 2, wherein, during the first or second stoppage time period, a standard deviation of the gravity direction information or of the angular velocity information is less than or equal to a predetermined value.

4. The method of claim 2, wherein the attitude error of the system for the first stoppage time period is output such that a difference between the first attitude and the second attitude varies linearly with respect to time and a difference between the first attitude and the second attitude at a start time of the first stoppage time period is 0.

5. The method of claim 4, wherein the attitude error for the movement time period is output such that a difference between the first attitude and the second attitude calculated at a start time and an end time of the movement time period varies linearly with respect to time and a difference between the first attitude and the second attitude at a start time of the movement time period is a difference between the first attitude and the second attitude calculated at an end time of the first stoppage time period.

6. The method of claim 5, wherein the attitude error during the second stoppage time period is output so that linear variation of the attitude error of the system during the movement time period extends to an end time of the second stoppage time period.

7. The method of claim 1, wherein the second attitude is given by:

$$\phi_{acc} = \tan^{-1}\left(\frac{-f_y^b}{-f_z^b}\right)$$

$$\theta_{acc} = \sin^{-1}\left(\frac{f_x^b}{g}\right) = \tan^{-1}\left(\frac{f_x^b}{\sqrt{(f_y^b)^2 + (f_z^b)^2}}\right),$$

$$\psi_{acc} = 0$$

where $\phi_{acc}$ is a roll angle, $\theta_{acc}$ is a pitch angle, $\psi_{acc}$ is a yaw angle, g is gravitational acceleration, and $f_x^b$, $f_y^b$, $f_z^b$ are the gravity direction information in a body frame.

8. An apparatus that compensates an attitude of an inertial navigation system, comprising:
   a movement sensor which senses movement of the system and outputs information for stoppage time periods and a movement time period of the system;
   an attitude calculating unit which receives angular velocity information of the system during every time period and calculates a first attitude of the system using the angular velocity information;
   an attitude error calculating unit which receives gravity direction information of the system during the stoppage time periods, calculates a second attitude of the system from the gravity direction information, and calculates an attitude error of the system for each time period using the first attitude and the second attitude; and an attitude compensating unit which compensates and outputs the attitude error for the first attitude.

9. The apparatus of claim 8, wherein the movement sensor divides the stoppage time period into a first stoppage time period before the system begins movement and a second stoppage time period after movement of the system stops.

10. The apparatus of claim 9, wherein the attitude error calculating unit approximates the attitude error so that a difference between the first attitude and the second attitude calculated at a start time and an end time of each time period varies linearly with respect to time, and calculates the attitude error of the system.

11. The apparatus of claim 8, wherein the attitude error calculating unit obtains the second attitude using:

$$\phi_{acc} = \tan^{-1}\left(\frac{-f_y^b}{-f_z^b}\right)$$

$$\theta_{acc} = \sin^{-1}\left(\frac{f_x^b}{g}\right) = \tan^{-1}\left(\frac{f_x^b}{\sqrt{(f_z^b)^2 + (f_z^b)^2}}\right),$$

$$\psi_{acc} = 0$$

where $\phi_{acc}$ is a roll angle, $\theta_{acc}$ is a pitch angle, $\psi_{acc}$ is a yaw angle, g is gravitational acceleration, and $f_x^b$, $f_y^b$, $f_z^b$ are the gravity direction information in a body frame.

12. A method of calculating a position of an inertial navigation system, comprising:

sensing movement of the system and outputting information for stoppage time periods and a movement time period of the system;

receiving angular velocity information of the system, calculating an attitude of the system using the angular velocity information, receiving acceleration information of the system, and compensating the attitude of the system using the acceleration information;

transforming the acceleration information into acceleration information in a space including the system using the compensated attitude; and calculating a position of the system in the space using the transformed acceleration information.

13. The method of claim 12, wherein the stoppage time periods include a first stoppage time period before the system begins movement and a second stoppage time period after movement of the system stops.

14. The method of claim 13, wherein during the first or second stoppage time period, standard deviation of the acceleration information or angular velocity information is less than or equal to a predetermined value.

15. The method of claim 14, wherein the calculating the attitude of the system and the compensating the attitude of the system comprises:

calculating a first attitude of the system using the angular velocity information for each of the time periods;

calculating a second attitude of the system using the acceleration information for each of the time periods and calculating the attitude error of the system for each of the time periods using the first attitude and the second attitude; and compensating and outputting the attitude error for the first attitude.

16. The method of claim 14, further comprising, between the transforming the acceleration information and the calculating the position of the system, obtaining an acceleration error value using the transformed acceleration information from the movement time period on a basis of a condition that the velocity is 0 at each time when the movement of the system starts and stops, and subtracting the calculated acceleration error value from the transformed acceleration information, thereby compensating for the transformed acceleration information.

17. The method of claim 14, further comprising, between the transforming the acceleration information and the calculating the position of the system, obtaining an acceleration error by linearly approximating the transformed acceleration information for each time period and compensating the acceleration error for the transformed acceleration information.

18. The method of claim 17, wherein the obtaining the acceleration comprises:

approximating the acceleration error such that the transformed acceleration information varies linearly with respect to time for the first and second stoppage time periods and setting the linearly-approximated acceleration information to 0;

linearly approximating the transformed acceleration information of the movement time period using linearly approximated gradients for the first and second stoppage time periods and a predetermined initial condition; and compensating the linearly-approximated acceleration information for the transformed acceleration information during the movement time period.

19. An apparatus that calculates a position of an inertial navigation system, comprising:

a movement sensor which senses movement of the system and outputs information for stoppage time periods and a movement time period of the system;

an attitude compensating unit which receives angular velocity information of the system, calculates an attitude of the system using the angular velocity information, receives acceleration information of the system, and compensates the attitude of the system using the acceleration information;

an acceleration transforming unit which transforms the acceleration information into acceleration information in a space including the system using the compensated attitude; and a position calculating unit which calculates a position of the system in the space using the transformed acceleration information.

20. The apparatus of claim 19, wherein the movement sensor divides the stoppage time periods into a first stoppage time period before the system begins movement and a second stoppage time period after movement of the system stops.

21. The apparatus of claim 20, wherein the movement sensor determines the first or second stoppage time period to be when standard deviation of the acceleration information or angular velocity information is less than or equal to a predetermined value.

22. The apparatus of claim 19, further comprising an acceleration compensating unit, between the acceleration transforming unit and the position calculating unit, which obtains an acceleration error value using the transformed acceleration information for the movement time period on a basis of a condition that the velocity is 0 when the movement of the system starts and stops, and subtracts the calculated acceleration error value from the transformed acceleration information, thereby compensating for the transformed acceleration information.

23. The apparatus of claim 19, further comprising an acceleration compensating unit, between the acceleration transforming unit and the position calculating unit, which linearly approximates the acceleration information transformed by the acceleration transforming unit during each time period and compensates for the transformed acceleration information using the linearly-approximated acceleration information.

24. The apparatus of claim 23, wherein the acceleration compensating unit approximates the acceleration error such that the transformed acceleration information varies linearly with respect to time for the first and second stoppage time periods, linearly approximates the transformed acceleration information for the movement time period using gradients of the linearly-approximated acceleration information, sets the linearly-approximated acceleration information of the first and second stoppage time periods to 0, and compensates the linearly-approximated acceleration information for the transformed acceleration information for the movement time period.

25. The apparatus of claim 19, wherein the position calculating unit calculates a first attitude and a second attitude of the system using the angular velocity information and the acceleration information for each of the time periods, calculates the attitude error of the system for each of the time periods using the first attitude and second attitude, and compensates the attitude error for the first attitude.

* * * * *